United States Patent
Sehsah et al.

(10) Patent No.: US 10,722,819 B2
(45) Date of Patent: Jul. 28, 2020

(54) SYSTEMS AND METHODS COMPRISING SMART SAMPLE CATCHER FOR DRILLING OPERATIONS

(71) Applicant: Saudi Arabian Oil Company, Dhahran (SA)

(72) Inventors: Ossama Sehsah, Dhahran (SA); Victor Carlos Costa de Oliveira, Dhahran (SA); Mario Augusto Rivas Martinez, Dhahran (SA)

(73) Assignee: Saudi Arabian Oil Company, Dhahran (SA)

( * ) Notice: Subject to any disclaimer, the term of this patent is extended or adjusted under 35 U.S.C. 154(b) by 0 days.

(21) Appl. No.: 16/597,059

(22) Filed: Oct. 9, 2019

(65) Prior Publication Data

US 2020/0038779 A1     Feb. 6, 2020

Related U.S. Application Data

(62) Division of application No. 15/788,284, filed on Oct. 19, 2017, now Pat. No. 10,478,754.

(51) Int. Cl.
*B01D 19/00* (2006.01)
*E21B 21/06* (2006.01)
*G05D 7/06* (2006.01)

(52) U.S. Cl.
CPC ..... *B01D 19/0063* (2013.01); *B01D 19/0031* (2013.01); *E21B 21/067* (2013.01); *G05D 7/0658* (2013.01); *E21B 21/065* (2013.01)

(58) Field of Classification Search
CPC ............ B01D 19/0063; B01D 19/0031; E21B 21/067; E21B 21/065; G05D 7/0658
(Continued)

(56) References Cited

U.S. PATENT DOCUMENTS

| 5,362,962 A | 11/1994 | Barborak et al. |
| 5,741,416 A | 4/1998 | Tempest, Jr. |

(Continued)

FOREIGN PATENT DOCUMENTS

| CN | 107152251 A | 9/2017 |
| CN | 107191147 A | 9/2017 |

OTHER PUBLICATIONS

International Search Report and Written Opinion for International Application No. PCT/US2018/056614; International Filing Date Oct. 19, 2018; Report dated Feb. 18, 2019 (pp. 1-13).

*Primary Examiner* — Thuan D Dang
(74) *Attorney, Agent, or Firm* — Bracewell LLP; Constance G. Rhebergen; Vivek P. Shankam

(57) ABSTRACT

A sample catching system for cleaning a drilling fluid in a drilling operation includes a first line having a first entrance valve configured to allow the drilling fluid to flow into the first line, a first chemical sensor for measuring the amount of hydrogen sulfide of the drilling fluid in the first line, and a first sample catch valve configured to allow the drilling fluid to flow out of the first line. The system also includes a second line having a second entrance valve configured to allow the drilling fluid to flow into the second line, a sample catch pump, and a controller configured to determine the amount of hydrogen sulfide is above a predetermined threshold value, and open the second entrance valve to divert drilling fluid intake from the first line to the second line, and close the first entrance valve to stop the drilling fluid from entering the first line.

10 Claims, 3 Drawing Sheets

(58) Field of Classification Search
USPC .......... 436/121, 25, 30, 31, 32, 33, 119, 120
See application file for complete search history.

(56) References Cited

U.S. PATENT DOCUMENTS

| | | |
|---|---|---|
| 6,557,630 B2 | 5/2003 | Harkins et al. |
| 6,609,573 B1 | 8/2003 | Day |
| 7,096,961 B2 | 8/2006 | Clark et al. |
| 8,127,867 B1 | 3/2012 | Droke |
| 8,236,182 B2 | 8/2012 | Lehman et al. |
| 8,528,665 B2 | 9/2013 | Jackson et al. |
| 9,194,216 B2 | 11/2015 | Lucas et al. |
| 2004/0256157 A1 | 12/2004 | Tessari et al. |
| 2007/0017674 A1 | 1/2007 | Blaisdell |
| 2007/0221413 A1 | 9/2007 | Sims et al. |
| 2011/0198080 A1 | 8/2011 | Demong |
| 2013/0193072 A1 | 8/2013 | Booth |
| 2015/0048033 A1 | 2/2015 | Burns et al. |
| 2016/0097247 A1 | 4/2016 | Marco et al. |
| 2017/0176404 A1 | 6/2017 | Calleri |

SYSTEMS AND METHODS COMPRISING SMART SAMPLE CATCHER FOR DRILLING OPERATIONS

CROSS-REFERENCE TO RELATED PATENT APPLICATIONS

This application is a Divisional of U.S. Non-Provisional application Ser. No. 15/788,284, filed Oct. 19, 2017, and titled "SYSTEMS AND METHODS COMPRISING SMART SAMPLE CATCHER FOR DRILLING OPERATIONS," the entire contents of which are incorporated by reference.

TECHNICAL FIELD

Example embodiments generally relate to automation in drilling operations, and more specifically relate to methods and systems for auto cleaning or sample catching the drilling fluid in a drilling operation.

BACKGROUND

Drilling a well in a hydrocarbon bearing subterranean formation for the production of hydrocarbons from the formation typically involves use of a drilling apparatus and drilling fluid. The drilling apparatus usually comprises a bit mounted on a string of hollow steel pipe. This hollow pipe is often used to rotate the bit to enable the bit to cut into the formation. The hollow pipe also acts as a conduit for the drilling fluid to be pumped down to the bottom of the hole, from where it rises to the surface via the annulus between the drill string and the borehole wall. The drilling fluid has many functions, one of the most important of which is to convey the cuttings from the bit downhole up to the surface of the well.

In drilling some subterranean formations, and often particularly those bearing oil or gas, hydrogen sulfide accumulations are frequently encountered. The drilling fluid brings the hydrogen sulfide to the surface. Such sulfide in the drilling fluid is problematic, as it can corrode the steel in the drilling apparatus and may be liberated into the atmosphere as toxic sulfide gas at the well surface, which may be very harmful to the drilling operation personnel on site.

Generally, to protect the health of those working with the drilling fluid and those at the surface of the well, conditions should be maintained to ensure that the concentration of hydrogen sulfide above the fluid, emitted due to the partial pressure of the gas, is less than about 15 ppm. The partial pressure of hydrogen sulfide at ambient temperature is a function of the concentration of sulfide ions in the fluid and the pH of the fluid. To ensure that the limit of 15 ppm is not exceeded even for the maximum sulfide concentration that may be encountered in a subterranean formation, the pH of the drilling fluid is typically maintained at a minimum of about 11.5. Also, to prevent the soluble sulfide concentration in the fluid from becoming excessive, action is routinely taken to remove sulfide from the fluid.

A common process for removing sulfide from drilling fluids is by precipitation, usually with a solid zinc compound. Zinc compounds commonly used are zinc oxide and zinc carbonate. These compounds react with hydrogen sulfide to form insoluble zinc sulfide. In insoluble form, the sulfide is relatively harmless (unless the pH falls to acid conditions) and can be removed from the fluid by known separation techniques.

Because these zinc compounds are solids, the reaction rate can be slow, which is especially undesirable when high concentrations of sulfide are encountered or when removal of final traces of sulfide is desired. However, soluble zinc salts cannot be used as they hydrolyze at low pH, forming gelatinous hydroxide. While the gelatinous hydroxide would still react with the sulfide, the gelatinous solid would likely interfere with the rheological properties of the drilling fluid. Also, zinc salts behave as acids and tend to reduce the pH of the fluid, increasing the risk of greater emission of hydrogen sulfide into the air.

Various zinc compounds, both soluble and insoluble, have been used as sulfide scavengers for many years and historically were generally regarded as an industry standard. However, all zinc compounds have the disadvantage that zinc is regarded as a toxic heavy metal whose discharge must be carefully controlled to protect the environment. When a zinc scavenger is used in the drilling fluid, the cuttings, as well as the residual fluid at the end of the drilling operation, will be contaminated with zinc. Environmental awareness has increasingly made use of zinc unacceptable. Most other heavy metals which react with hydrogen sulfide to form insoluble sulfide such as copper (both oxidation states), mercury, lead, and nickel, also cause environmental concerns and thus are no more acceptable than zinc.

SUMMARY

Accordingly, there exists a need for automation in this area of the drilling operation, and more specifically for a smart sample catch mechanism for regularly cleaning the drilling fluid in a drilling operation.

One example embodiment is a sample catching system for cleaning a drilling fluid in a drilling operation. The sample catching system includes a first line including a first entrance valve operable to allow the drilling fluid to flow into the first line, a first chemical sensor for measuring a first amount of hydrogen sulfide of the drilling fluid in the first line, and a first sample catch valve operable to allow the drilling fluid to flow out of the first line. The sample catching system also includes a second line including a second entrance valve operable to allow the drilling fluid to flow into the second line, a second chemical sensor for measuring a second amount of hydrogen sulfide of the drilling fluid in the second line, and a second sample catch valve operable to allow the drilling fluid to flow out of the second line. The sample catching system further includes a sample catch pump operatively connected to the first sample catch valve and the second sample catch valve via a sample catch line, the sample catch pump operable to pump the drilling fluid from the first line or the second line and remove unwanted material from the drilling fluid. The sample catching system further includes a controller operatively connected to the first entrance valve, the first chemical sensor, the first sample catch valve, the second entrance valve, the second chemical sensor, the second sample catch valve, and the sample catch pump, wherein the controller is configured to determine the first amount of hydrogen sulfide is above a predetermined threshold value, at least partially open the second entrance valve to divert drilling fluid intake from the first line to the second line, and close the first entrance valve to stop the drilling fluid from entering the first line. The sample catching system further includes a third line including two or more valves configured to control flow of the drilling fluid into and out of the third line, and two or more sample catch valves configured to allow the drilling fluid to flow out of the third line, wherein the sample catch pump is operatively connected to the two or more sample catch valves via a sample catch line, the sample catch pump configured to pump the drilling fluid from the third line into the sample catch line and to the sample catch and remove unwanted material from the drilling fluid. In one example embodiment, the sample catching system may be installed between a drilling rig and a shaker.

Another example embodiment is a method for cleaning a drilling fluid in a drilling operation using a sample catching system. The method may include measuring, by a first chemical sensor installed on a first line, a first amount of hydrogen sulfide of the drilling fluid in the first line, the first line having a first entrance valve operable to allow the drilling fluid to flow into the first line, and a first sample catch valve operable to allow the drilling fluid to flow out of the first line, determining, by a controller operatively connected to the first chemical sensor, the first amount of hydrogen sulfide is above a predetermined threshold value, at least partially opening a second entrance valve operable to allow the drilling fluid to flow into a second line, closing, by the controller, the first entrance valve to stop the drilling fluid from entering the first line, and at least partially opening the first sample catch valve to divert the drilling fluid in the first line to a sample catch pump operatively connected to the first sample catch valve via a sample catch line for removal of unwanted material from the drilling fluid. The method may also include pumping, by the sample catch pump, the drilling fluid from the first line to remove unwanted material from the drilling fluid. The method may also include installing the sample catching system between a drilling rig and a shaker.

BRIEF DESCRIPTION OF THE DRAWINGS

So that the manner in which the features, advantages and objects of the invention, as well as others which may become apparent, are attained and can be understood in more detail, more particular description of the invention briefly summarized above may be had by reference to the embodiment thereof which is illustrated in the appended drawings, which drawings form a part of this specification. It is to be noted, however, that the drawings illustrate only example embodiments of the invention and is therefore not to be considered limiting of its scope as the invention may admit to other equally effective embodiments.

DETAILED DESCRIPTION

The methods and systems of the present disclosure will now be described more fully hereinafter with reference to the accompanying drawings in which embodiments are shown. The methods and systems of the present disclosure may be in many different forms and should not be construed as limited to the illustrated embodiments set forth herein; rather, these embodiments are provided so that this disclosure will be thorough and complete, and will fully convey its scope to those skilled in the art. Like numbers refer to like elements throughout.

Figure 1:
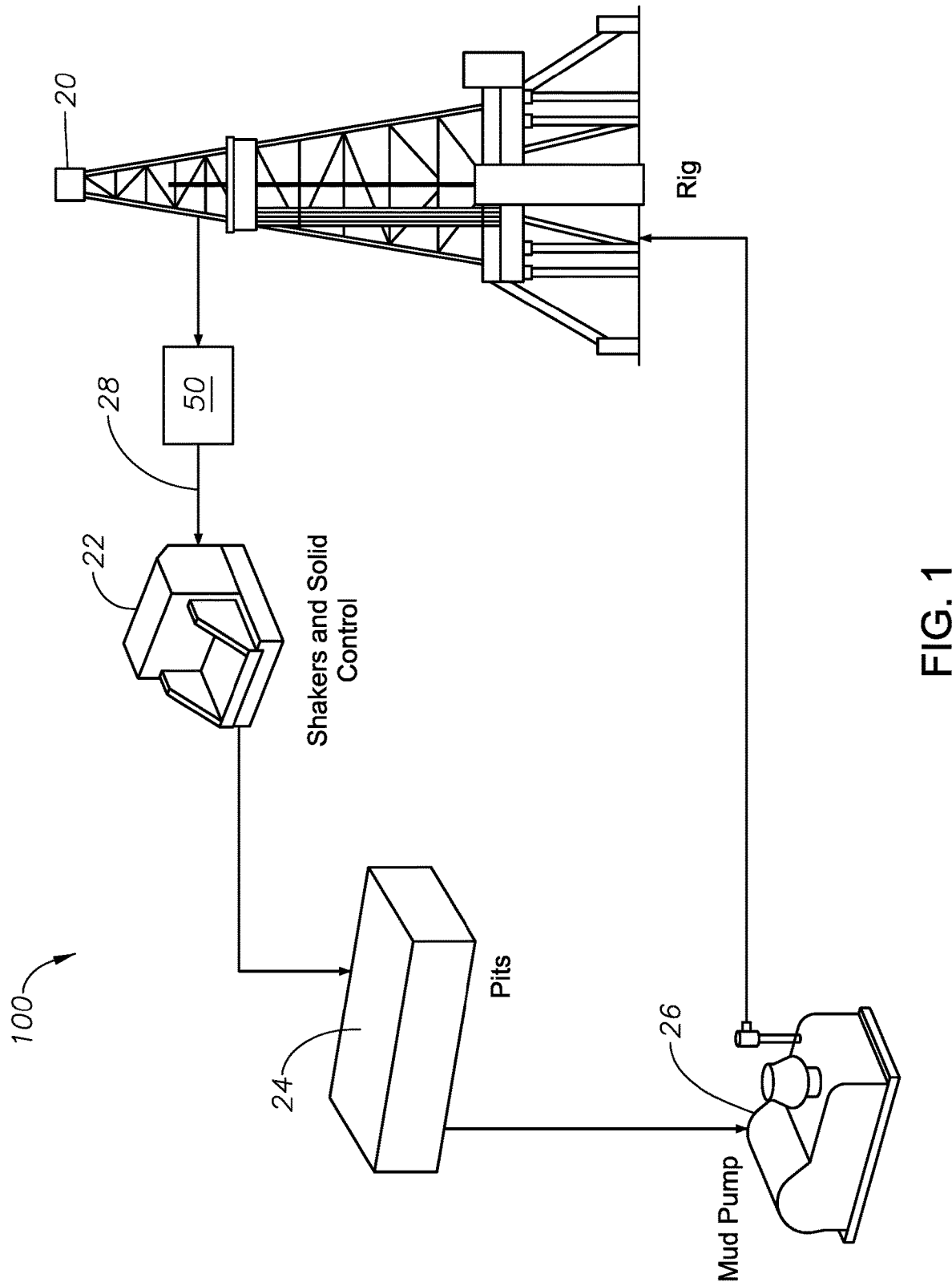
FIG. 1 is a schematic of a drilling rig with an example sample catching system for cleaning a drilling fluid in a drilling operation, according to one or more example embodiments of the disclosure.

Turning now to the figures, FIG. 1 is a schematic of a drilling rig 100 with an example sample catching system 50 for cleaning a drilling fluid in a drilling operation, according to one or more example embodiments of the disclosure. During the drilling operation, the drilling fluid or drilling mud may circulate from stand pipe 20 to shakers 22, from shakers 22 to mud pit 24, from mud pit 24 to mud pump 26, and from mud pump 26 back to the stand pipe or rig 20. As illustrated in this figure, the sample catching system 50 can be installed between the drilling rig 20 and shakers 22. Each of the drilling equipment may be interconnected via a pipe line 28 that may transport the drilling fluid for performing the drilling operation.

Figure 2:
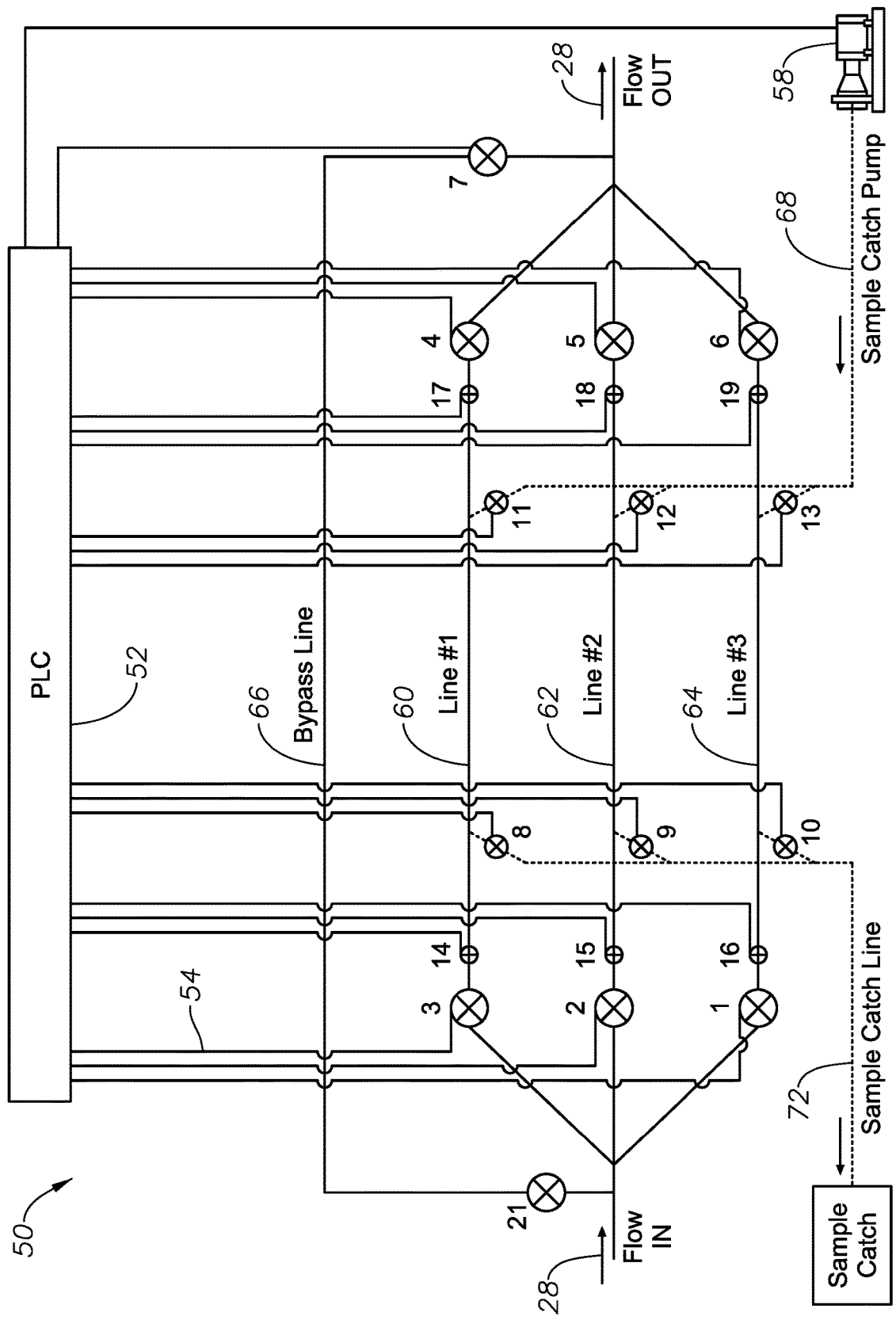
FIG. 2 illustrates an example sample catching system for cleaning a drilling fluid in a drilling operation, according to one or more example embodiments of the disclosure.

FIG. 2 illustrates the sample catching system 50 according to one or more example embodiments of the disclosure in further detail. The system 50 may include the three main lines 60, 62, and 64, and a bypass line 66. Each of the lines 60, 62, 64, 66 may be equipped with one or more high closing ratio (HCR) valves to control the flow of the drilling fluid into and out of the respective lines. For example, line 60 may have an entrance valve 3 and an exit valve 4. Similarly, line 62 may have an entrance valve 2 and an exit valve 5. Similarly, line 64 may have an entrance valve 1 and an exit valve 6. The bypass line 66 may be equipped with an entrance valve 21 and exit valve 7 to control the flow of drilling fluid in line 66, for example.

Main lines 60, 62, 64 may also be equipped with one or more chemical sensors 14-19 to measure amount of hydrogen sulfide of the drilling fluid in each of these lines at different locations. For example, chemical sensor 14 can measure the amount of hydrogen sulfide of the drilling fluid at the entrance in line 60, and chemical sensor 17 can measure the amount of hydrogen sulfide of the drilling fluid at the exit on line 60. Similarly, chemical sensor 15 can measure the amount of hydrogen sulfide of the drilling fluid at the entrance in line 62, and chemical sensor 18 can measure the amount of hydrogen sulfide of the drilling fluid at the exit on line 62. Similarly, chemical sensor 16 can measure the amount of hydrogen sulfide of the drilling fluid at the entrance in line 64, and chemical sensor 19 can measure the amount of hydrogen sulfide of the drilling fluid at the exit on line 64. Chemical sensors 14-19 act as a transducer and generate a signal as a function of the amount of hydrogen sulfide contained in the fluid. Chemical sensors 14-19 can include any type of chemical sensor, including but not limited to, biosensors.

Main lines 60, 62, 64 can also be connected to a sample catching pump 58 via a sample catching line 68. Each of the main lines 60, 62, 64 can be equipped with one or more sample catch valves 8-13 to control flow of the drilling fluid out of the respective lines. For example, main line 60 may be equipped with a sample catch valve 8 at the entrance of the line and a sample catch valve 11 at the exit of the line 60. Similarly, main line 62 may be equipped with a sample catch valve 9 at the entrance of the line and a sample catch valve 12 at the exit of the line 62. Similarly, main line 64 may be equipped with a sample catch valve 10 at the entrance of the line and a sample catch valve 13 at the exit of the line 64. Each of these valves may allow the drilling fluid to exit the respective lines and enter a sample catch 70 via sample catch line 72. The sample catch pump 58 may be configured to pump the fluid into one or more lines 60, 62, 64 via line 68, into sample catch line 72, and into sample catch 70 for conducting further analysis.

Valves 1-7 and 21, sample catch valves 8-13, chemical sensors 14-19, and the sample catching pump 58 may all be operatively connected to a controller 52 via lines 54 for controlling an operation thereof. The controller 52 may be a programmable logic controller (PLC) or programmable controller 52 that may include a digital computer or one or more processors. Controller 52 may be designed for multiple arrangements of digital and analog inputs and outputs, extended temperature ranges, immunity to electrical noise, and resistance to vibration and impact. According to one example embodiment, programs to control machine operation may be typically stored in a battery-backed-up or non-volatile memory. Controller 52 can be programmed in a variety of ways, from the relay-derived ladder logic to programming languages such as specially adapted dialects of BASIC and C. Another example method is state logic, a very high-level programming language designed to program PLCs based on state transition diagrams.

In one example embodiment, line 60 may be active and the system 50 automatically keeps valves 3 and 4 open. In this case, valves 1, 2, 5, 6, 7, 8, 11, and 21 may be closed, so the flow may pass throughout the line 60. However, when the controller 52 determines, using a measurement from either sensor 14 or sensor 17, that the amount of hydrogen sulfide is greater than a predetermined threshold value, it causes the system to switch from line 60 to line 62. In doing so the controller 52 causes to at least partially open valves 2 and 5, and valves 1, 3, 4, 6, 7, 9, 12, and 21 may be closed so the flow may pass throughout line 62. In one example embodiment, line 60 can be flushed by automatically closing valves 3, 4, 9, 10, 12 and 13, and opening valves 8 and 11, and sample catch pump is turned ON so the pipe filter inside line 60 can be cleaned automatically, and the flow may be directed by the sample catch pump 58 into valve 11 via line 68, through line 60, through valve 8, through sample catch line 72, and into sample catch 70 for further analysis.

In a further example, when the controller 52 determines that the amount of hydrogen sulfide difference in line 62 is greater than the predetermined threshold value, it causes the system to switch from line 62 to line 64. In doing so the controller 52 causes to at least partially open valves 1 and 6, and valves 2, 3, 4, 5, 7, 10, 13, and 21 may be closed so the flow may pass throughout line 64. In one embodiment, for flushing line 62, valves 2, 5, 8, 10, 11 and 13 may be automatically closed, and valves 9 and 12 may be open, and sample catch pump may be ON so the pipe filter inside line 62 can be cleaned automatically, and the flow may be directed by the sample catch pump 58 into valve 12 via line 68, through line 62, through valve 9, through sample catch line 72, and into sample catch 70 for further analysis.

In a further example, when the controller 52 determines that the amount of hydrogen sulfide in line 64 is greater than a predetermined threshold value, it causes the system to switch from line 64 back to line 60. In doing so the controller 52 causes to at least partially to open valves 3 and 4, and valves 1, 2, 5, 6, 7, 8, 11, and 21 may be closed so that the flow may pass throughout line 60. Similarly, for flushing line 64, valves 1, 6, 8, 9, 11 and 12 may be automatically closed, valves 10 and 13 may be open, and sample catch pump may be ON so the pipe filter inside line 64 can be cleaned automatically, and the flow may be directed by the sample catch pump 58 into valve 13 via line 68, through line 64, through valve 10, through sample catch line 72, and into sample catch 70 for further analysis. Although the above examples illustrate transition of the drilling fluid from line 60 to line 62, line 62 to line 64, and line 64 to 60, this transition is for illustrative purposes only. The actual order of transition may vary depending on the availability of the lines, i.e. whether or not a particular line is completely flushed out. If none of the lines 60-64 are being used by the system, then bypass line 66 can be activated by closing valves 1, 2, 3, 4, 5 and 6, and opening entrance valve 21 and exit valve 7 so the flow can be directed straight to line 66.

As illustrated in FIG. 2, the sample catching system 50, according to one example embodiment, includes a system of three pipe screens located at three independent lines, and may be located between a drilling rig and the shakers. The system 50 may be electronically monitored using individual amount of hydrogen sulfide monitoring, and the mud may pass through one line each time, and another two lines work as a backup. The system may be able to deliver clear information to the driller due to the chemical sensors installed in each line, and information can be delivered to the rig floor via a monitor control, for example. The sample catching system 50 described uses a closed loop system without exposing the rig crew to any dangerous gases coming out of the hole. The system 50 may be able to collect the sample in real time while drilling without having to stop the drilling operation. Signals can be sent to a PLC 52 with a monitor or human machine interface (HMI) to analyze and alarm, and also can operate an actuated valve to switch/divert the drilling fluid until fixing the problem.

Accordingly, one example embodiment is a sample catching system 50 for cleaning a drilling fluid in a drilling operation. The sample catching system 50 includes a first line 60 including a first entrance valve 3 configured to allow the drilling fluid to flow into the first line 60, an exit valve 4 configured to allow the drilling fluid to flow out of the first line 60, a first chemical sensor 14 configured to measure a first amount of hydrogen sulfide of the drilling fluid in the first line 60 at an entrance point, a second chemical sensor 17 configured to measure a second amount of hydrogen sulfide of the drilling fluid in the first line 60 at an exit point, and an entrance catch valve 11 and an exit catch valve 8 configured to allow the drilling fluid to flow through and out of the first line 60. The sample catching system 50 further includes a second line 62 including a second entrance valve 2 configured to allow the drilling fluid to flow into the second line 62, an exit valve 5 configured to allow the drilling fluid to flow out of the second line 62, chemical sensors 15, 18 configured to measure the amount of hydrogen sulfide of the drilling fluid in the second line 62, and an entrance catch valve 12 and an exit catch valve 9 configured to allow the drilling fluid to flow through and out of the second line 62. The sample catching system 50 further includes a third line 64 including an entrance valve 1 configured to allow the drilling fluid to flow into the third line 64, an exit valve 6 configured to allow the drilling fluid to flow out of the third line 64, chemical sensors 16, 19 configured to measure the amount of hydrogen sulfide of the drilling fluid in the third line 64, and an entrance catch valve 13 and an exit catch valve 10 configured to allow the drilling fluid to flow through and out of the third line 64. The sample catching system 50 further includes a bypass line 66 including an entrance valve 21 configured to allow the drilling fluid to flow into the bypass line 66, and an exit valve 7 configured to allow the drilling fluid to flow out of the bypass line 66.

The sample catching system 50 further includes a sample catch pump 58 operatively connected to sample catch valves 8-13 via line 68. The sample catch pump 58 is configured to pump the drilling fluid into the first line 60 or the second line 62 or the third line 64 via line 68. The sample catching system 50 further includes a controller 52 operatively connected at least to entrance valves 1-3, 21, exit valves 4-7, chemical sensors 14-19, sample catch valves 8-13, and the sample catch pump 58. The controller 58 may be configured to determine the amount of hydrogen sulfide is above a predetermined threshold value, and at least partially open the second entrance valve 2 to divert drilling fluid intake from the first line 60 to the second line 62, and close the first entrance valve 3 to stop the drilling fluid from entering the first line 60. In doing so the controller 52 causes to at least partially open valves 2 and 5, and valves 1, 3, 4, 6, 7, 9, 12, and 21 may be closed so the flow may pass throughout line 62. In one example embodiment, line 60 can be flushed by automatically closing valves 3, 4, 9, 10, 12 and 13, and opening valves 8 and 11, and sample catch pump is turned ON so the pipe filter inside line 60 can be cleaned automatically, and the flow may be directed by the sample catch pump 58 into valve 11 via line 68, through line 60, through valve 8, through sample catch line 72, and into sample catch 70 for further analysis.

In a further example, when the controller 52 determines that the amount of hydrogen sulfide difference in line 62 is greater than the predetermined threshold value, it causes the system to switch from line 62 to line 64. In doing so the controller 52 causes to at least partially open valves 1 and 6, and valves 2, 3, 4, 5, 7, 10, 13, and 21 may be closed so the flow may pass throughout line 64. In one embodiment, for flushing line 62, valves 2, 5, 8, 10, 11 and 13 may be automatically closed, and valves 9 and 12 may be open, and sample catch pump may be ON so the pipe filter inside line 62 can be cleaned automatically, and the flow may be directed by the sample catch pump 58 into valve 12 via line 68, through line 62, through valve 9, through sample catch line 72, and into sample catch 70 for further analysis.

In a further example, when the controller 52 determines that the amount of hydrogen sulfide in line 64 is greater than a predetermined threshold value, it causes the system to switch from line 64 back to line 60. In doing so the controller 52 causes to at least partially to open valves 3 and 4, and valves 1, 2, 5, 6, 7, 8, 11, and 21 may be closed so that the flow may pass throughout line 60. Similarly, for flushing line 64, valves 1, 6, 8, 9, 11 and 12 may be automatically closed, valves 10 and 13 may be open, and sample catch pump may be ON so the pipe filter inside line 64 can be cleaned automatically, and the flow may be directed by the sample catch pump 58 into valve 13 via line 68, through line 64, through valve 10, through sample catch line 72, and into sample catch 70 for further analysis. Although the above examples illustrate transition of the drilling fluid from line 60 to line 62, line 62 to line 64, and line 64 to 60, this transition is for illustrative purposes only. The actual order of transition may vary depending on the availability of the lines, i.e. whether or not a particular line is completely flushed out. If none of the lines 60-64 are being used by the system, then bypass line 66 can be activated by closing valves 1, 2, 3, 4, 5 and 6, and opening entrance valve 21 and exit valve 7 so the flow can be directed straight to line 66.

In one example embodiment, the sample catching system 50 can also include a human machine interface (not shown) that may be connected to the controller 52 for displaying an alert message and receiving an instruction from an operator. The controller 52 may activate or deactivate any of the valves 1-13, 21 based on an input received form the operator. The phrase "at least partially opening the valve" refers to the operation of at least partially opening the valve. For example, a valve may be partially open or completely open at a certain point in time. As described herein, the phrase "at least partially open" covers both scenarios where a valve may be partially or fully open.

Figure 3:
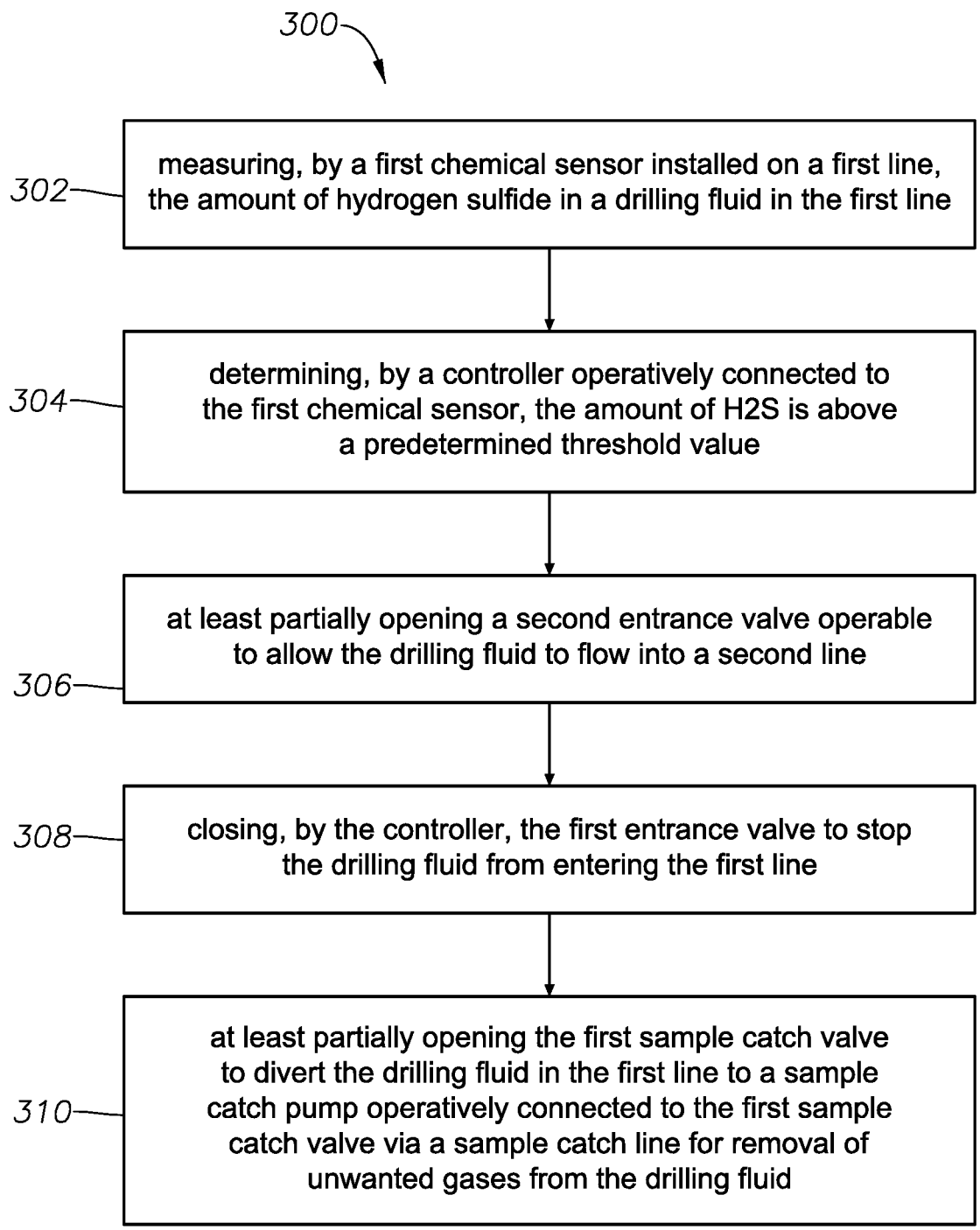
FIG. 3 illustrates example operations in a method for sample catching a drilling fluid in a drilling operation, according to one or more example embodiments of the disclosure.

FIG. 3 illustrates example operations in a method 300 for sample catching a drilling fluid in a drilling operation, according to one or more example embodiments of the disclosure. For purposes of simplicity of explanation, the example method disclosed herein is presented and described as a series of blocks (with each block representing an action or an operation in a method, for example). However, it is to be understood and appreciated that the disclosed method is not limited by the order of blocks and associated actions or operations, as some blocks may occur in different orders and/or concurrently with other blocks from those that are shown and described herein. For example, the various methods (or processes or techniques) in accordance with this disclosure can be alternatively represented as a series of interrelated states or events, such as in a state diagram. Furthermore, not all illustrated blocks, and associated action(s), may be required to implement a method in accordance with one or more aspects of the disclosure. Further yet, two or more of the disclosed methods or processes can be implemented in combination with each other, to accomplish one or more features or advantages described herein.

The method 300 includes measuring, by a first chemical sensor 14 installed on a first line 60, a first amount of hydrogen sulfide of the drilling fluid in the first line 60, at step 302. The method further includes determining, by a controller 52 operatively connected to the first chemical sensor 14, the first amount of hydrogen sulfide is above a predetermined threshold value, at step 304. At step 306, the controller 52 at least partially opens a second entrance valve 2 operable to allow the drilling fluid to flow into a second line 62, and at step 308, the controller 52 closes the first entrance valve 3 to stop the drilling fluid from entering the first line 60. At step 310, the controller 52 at least partially opens the first sample catch valve 8 to divert the drilling fluid in the first line 60 to a sample catch 70 operatively connected to the first sample catch valve 8 via a sample catch line 72 for removal of unwanted material from the drilling fluid. In doing so the controller 52 causes to at least partially open valves 2 and 5, and valves 1, 3, 4, 6, 7, 9, 12, and 21 may be closed so the flow may pass throughout line 62. In one example embodiment, line 60 can be flushed by automatically closing valves 3, 4, 9, 10, 12 and 13, and opening valves 8 and 11, and sample catch pump is turned ON so the pipe filter inside line 60 can be cleaned automatically, and the flow may be directed by the sample catch pump 58 into valve 11 via line 68, through line 60, through valve 8, through sample catch line 72, and into sample catch 70 for further analysis.

In another example embodiment, the sample catching system includes three pipe screens located at three independent lines and the system can be positioned between the rig floor and shakers. The system can be electronic monitored and/or controlled via individual amount of hydrogen sulfide monitoring, and the mud can pass through one line at a time, while another two lines will work as a backup. The system will be able to send the cuttings to be collected in a sample box 70 avoiding human presence around shakers and improving the safety. All systems can be controlled and monitored according input values and information delivered to rig floor via monitor control. The three main lines that can be switched from each other according to the previous depth and/or amount of hydrogen sulfide limits inputs. As soon as the depth and/or amount of hydrogen sulfide achieve the desire value the system will automatically switch for the next line, and the sample catch pump will be activated to clean the line and send the formation cutting for the sample catch. In one example embodiment, the sample catching system 50 can also include a human machine interface (not shown) that may be connected to the controller for displaying a message and receiving an instruction from an operator. The controller 52 may actuate any of the valves 1-13, 21 based on an input received form the operator.

The Specification, which includes the Summary, Brief Description of the Drawings and the Detailed Description, and the appended Claims refer to particular features (including process or method steps) of the disclosure. Those of skill in the art understand that the invention includes all possible combinations and uses of particular features described in the Specification. Those of skill in the art understand that the disclosure is not limited to or by the description of embodiments given in the Specification.

Those of skill in the art also understand that the terminology used for describing particular embodiments does not limit the scope or breadth of the disclosure. In interpreting the Specification and appended Claims, all terms should be interpreted in the broadest possible manner consistent with the context of each term. All technical and scientific terms used in the Specification and appended Claims have the same meaning as commonly understood by one of ordinary skill in the art to which this invention belongs unless defined otherwise.

As used in the Specification and appended Claims, the singular forms "a," "an," and "the" include plural references unless the context clearly indicates otherwise. The verb "comprises" and its conjugated forms should be interpreted as referring to elements, components or steps in a non-exclusive manner. The referenced elements, components or steps may be present, utilized or combined with other elements, components or steps not expressly referenced. The verb "operatively connecting" and its conjugated forms means to complete any type of required junction, including electrical, mechanical or fluid, to form a connection between two or more previously non-joined objects. If a first component is operatively connected to a second component, the connection can occur either directly or through a common connector. "Optionally" and its various forms means that the subsequently described event or circumstance may or may not occur. The description includes instances where the event or circumstance occurs and instances where it does not occur.

Conditional language, such as, among others, "can," "could," "might," or "may," unless specifically stated otherwise, or otherwise understood within the context as used, is generally intended to convey that certain implementations could include, while other implementations do not include, certain features, elements, and/or operations. Thus, such conditional language generally is not intended to imply that features, elements, and/or operations are in any way required for one or more implementations or that one or more implementations necessarily include logic for deciding, with or without user input or prompting, whether these features, elements, and/or operations are included or are to be performed in any particular implementation.

The systems and methods described herein, therefore, are well adapted to carry out the objects and attain the ends and advantages mentioned, as well as others inherent therein. While example embodiments of the system and method has been given for purposes of disclosure, numerous changes exist in the details of procedures for accomplishing the desired results. These and other similar modifications may readily suggest themselves to those skilled in the art, and are intended to be encompassed within the spirit of the system and method disclosed herein and the scope of the appended claims.

The invention claimed is:

1. A method for cleaning a drilling fluid in a drilling operation using a sample catching system, the method comprising:
   measuring, by a first chemical sensor installed on a first line, a first amount of hydrogen sulfide of the drilling fluid in the first line, the first line having a first entrance valve allowing the drilling fluid to flow into the first line, and a first sample catch valve allowing the drilling fluid to flow out of the first line;
   determining, by a controller operatively connected to the first chemical sensor, the first amount of hydrogen sulfide is above a predetermined threshold value;
   upon determining, at least partially opening a second entrance valve allowing the drilling fluid to flow into a second line; and
   closing, by the controller, the first entrance valve to stop the drilling fluid from entering the first line.

2. The method of claim 1, further comprising:
   the controller at least partially opening the first sample catch valve to divert the drilling fluid in the first line to a sample catch pump operatively connected to the first sample catch valve via a sample catch line for removal of unwanted material from the drilling fluid.

3. The method of claim 2, further comprising:
   pumping, by the sample catch pump, the drilling fluid from the first line to remove unwanted material from the drilling fluid.

4. The method of claim 3, further comprising:
   providing a third line comprising two or more valves configured to control flow of the drilling fluid into and out of the third line, and two or more sample catch valve configured to allow the drilling fluid to flow out of the third line;
   connecting the sample catch pump to the two or more sample catch valves via a sample catch line, wherein the sample catch pump configured to pump the drilling fluid from the third line and remove unwanted material from the drilling fluid.

5. The method of claim 4, further comprising:
   providing a third chemical sensor configured to measure a third amount of hydrogen sulfide of the drilling fluid in the second line at an entrance point;
   providing a fourth chemical sensor configured to measure a fourth amount of hydrogen sulfide of the drilling fluid in the second line at an exit point;
   connecting the controller to the third chemical sensor, the fourth chemical sensor, the two or more valves of the third line, wherein the controller is configured to:
      determine the third amount or the fourth amount of hydrogen sulfide is above the predetermined threshold value;
      at least partially open an entrance valve of the third line to divert drilling fluid intake from the second line to the third line; and
      close the second entrance valve to stop the drilling fluid from entering the second line.

6. The method of claim 1, wherein the predetermined threshold value is either 10 ppm or 15 ppm.

7. The method of claim 1, wherein the first entrance valve and the second entrance valve comprise a High Closing Ratio or Hydraulic Control Remote (HCR) valve.

8. The method of claim 1, further comprising:
bypassing the sample catching system via a bypass line controlled by a third valve connected to the controller.

9. The method of claim 1, further comprising:
displaying an alert message on a human machine interface operatively connected to the controller, and receiving an instruction from an operator.

10. The method of claim 1, further comprising:
installing the sample catching system between a drilling rig and a shaker.

* * * * *